US012631056B2

(12) United States Patent
Inan et al.

(10) Patent No.: US 12,631,056 B2
(45) Date of Patent: May 19, 2026

(54) MOTOR-VEHICLE LOCK

(71) Applicant: KIEKERT AG, Heiligenhaus (DE)

(72) Inventors: Ömer Inan, Dorsten (DE); Peter Szegeny, Engelskirchen (DE); Michael Scholz, Essen (DE); Holger Schiffer, Meerbusch (DE); Manuel Reusch, Düsseldorf (DE); Michael Herrmann, Neukirchen-Vluyn (DE)

(73) Assignee: KIEKERT AG, Heiligenhaus (DE)

( * ) Notice: Subject to any disclaimer, the term of this patent is extended or adjusted under 35 U.S.C. 154(b) by 147 days.

(21) Appl. No.: 18/557,375

(22) PCT Filed: Mar. 17, 2022

(86) PCT No.: PCT/DE2022/100207
§ 371 (c)(1),
(2) Date: Oct. 26, 2023

(87) PCT Pub. No.: WO2022/233354
PCT Pub. Date: Nov. 10, 2022

(65) Prior Publication Data

US 2024/0200369 A1 Jun. 20, 2024

(30) Foreign Application Priority Data

May 3, 2021 (DE) ..................... 10 2021 111 341.5

(51) Int. Cl.
*E05B 81/62* (2014.01)
*E05B 81/14* (2014.01)
(Continued)

(52) U.S. Cl.
CPC .............. *E05B 81/30* (2013.01); *E05B 81/14* (2013.01); *E05B 81/15* (2013.01); *E05B 81/62* (2013.01); *E05B 81/66* (2013.01)

(58) Field of Classification Search
CPC .......... E05B 81/14; E05B 81/42; E05B 81/34; E05B 81/56; E05B 81/58; E05B 81/62; E05B 81/64; E05B 81/66; E05B 81/68
See application file for complete search history.

(56) References Cited

U.S. PATENT DOCUMENTS 7,384,080 B2 * 6/2008 Kachouh ................ E05B 81/14 292/216
11,142,931 B2 * 10/2021 Katagawa .............. E05B 81/16
(Continued)

FOREIGN PATENT DOCUMENTS

DE 19725416 C1 1/1999
DE 10009391 A1 9/2001
(Continued)

OTHER PUBLICATIONS

International Search Report mailed Jun. 8, 2022, for priority International Application No. PCT/DE2022/100207.

*Primary Examiner* — Kristina R Fulton
*Assistant Examiner* — Noah Horowitz
(74) *Attorney, Agent, or Firm* — Renner, Otto, Boisselle & Sklar, LLP.

(57) ABSTRACT

A method and a device for operating an opening drive for a motor-vehicle lock, in particular motor-vehicle door lock. Also provided is a locking mechanism which consists substantially of a rotary latch and a pawl. Further, a sensor associated with the rotary latch is provided, as well as a drive unit that indirectly or directly acts upon the pawl, the drive unit being controlled according to signals of the sensor. According to the invention, the sensor produces a signal only once the rotary latch can be freely opened.

11 Claims, 2 Drawing Sheets

(51) Int. Cl.
*E05B 81/30* (2014.01)
*E05B 81/66* (2014.01)

(56) References Cited

U.S. PATENT DOCUMENTS

| | | | | |
|---|---|---|---|---|
| 12,084,898 | B2 * | 9/2024 | Pilested | E05B 81/80 |
| 12,163,360 | B2 * | 12/2024 | Patane | E05B 81/30 |
| 2007/0029814 | A1 * | 2/2007 | Coleman | E05B 81/14 292/201 |
| 2016/0076277 | A1 | 3/2016 | Kouzuma | |
| 2018/0195318 | A1 | 7/2018 | Katagawa | |
| 2024/0133217 | A1 * | 4/2024 | Yokota | E05B 81/42 |

FOREIGN PATENT DOCUMENTS

| | | | |
|---|---|---|---|
| DE | 102004042966 | A1 | 3/2006 |
| DE | 102005052665 | A1 | 7/2006 |
| DE | 102013012015 | A1 | 1/2015 |
| DE | 102018113595 | A1 | 12/2019 |
| DE | 102020111823 | A1 | 11/2021 |
| WO | 2019141314 | A1 | 7/2019 |

* cited by examiner

MOTOR-VEHICLE LOCK

This application is a national phase of International Application No. PCT/DE2022/100207 filed Mar. 17, 2022, which claims priority to Germany Patent Application No. 10 2021 111 341.5 filed May 3, 2021, each of which is hereby incorporated herein by reference in its entirety.

FIELD OF DISCLOSURE

The invention relates to a method and an associated device for operating an opening drive for a motor-vehicle lock, in particular a motor-vehicle door lock, with a locking mechanism consisting substantially of a rotary latch and a pawl, further with a sensor associated with the rotary latch, and with a drive unit acting indirectly or directly on the pawl, according to which the drive unit is controlled as a function of the signal from the sensor.

BACKGROUND OF DISCLOSURE

Motor-vehicle locks, and motor-vehicle door locks in particular, are increasingly being designed as so-called electric locks for reasons of convenience and in this context have an electric motor-driven opening mechanism. This makes the opening of the locking mechanism particularly convenient. In fact, to actuate the drive unit, it is usually sufficient to actuate a switch or sensor, for example, on or in an exterior door handle, the sensing of which then actuates the drive unit to open the previously closed locking mechanism. For this purpose, the drive unit works indirectly or directly on the pawl. During the opening process, the pawl is lifted from its engagement with the rotary latch so that the rotary latch then opens spring-assisted and releases a previously captured locking bolt. This also allows a door, flap or similar equipped with the motor-vehicle lock or motor-vehicle door lock in question to be opened. This has proven to be fundamentally successful.

In fact, the prior art genus-forming approach according to DE 10 2004 042 966 A1 is that the known motor-vehicle lock is equipped with a lock latch monitoring. A control apparatus now ensures the motorized release of the pawl as a function of the lock latch monitoring. For lock latch monitoring, the prior art uses, among other things, a so-called AJAR switch, which detects the beginning of the opening process of the lock latch. In fact, with the help of such AJAR switches, it is generally already possible to determine a half-open or incipient opening state of the rotary latch.

DE 10 2005 052 665 A1 describes a drive apparatus for motorized adjustment of a functional element in a motor vehicle. The functional element can also be a pawl. In order to reduce loads in this context, one of the methods used is a time window for energizing a drive motor. The time window is dimensioned in such a manner that the pawl in the example case safely reaches a so-called target position within the time window. This eliminates the need for additional interrogation of the rotary latch.

DE 10 2013 012 015 A1 deals with a motor-vehicle lock that has a main motor and an auxiliary motor. Both motors are configured to open the pawl. In addition, an opening signal can be derived from a sensor on the lock latch. The sensor is again an AJAR switch.

Finally, the teaching to be considered according to DE 100 09 391 A1 concerns a motor-vehicle door lock in which the blocking of an electric motor there is accompanied by a detectable increase in current. In this case, a position sensor is explicitly omitted.

The prior art has basically proven itself when it comes to providing opening drives or a drive unit operating by means of an electric motor for the direct or indirect actuation of a pawl. For this purpose, either the signal of the sensory system interrogating the rotary latch or also a current rise of the electric motor as part of the drive unit is evaluated. However, in practice, functional states may arise in which interaction between the pawl and the opening rotary latch occurs or may occur unchanged. For this reason, in practice, the pawl is usually actuated over the entire travel area of the rotary latch with the aid of the drive unit, i.e., as a rule up to a so-called overtravel area.

This overtravel area extends substantially subsequently to the position of the pawl beyond the main detent. This means that even if the pawl has already left the main detent of the rotary latch, the pawl is still loaded up to the overtravel area as a precaution, i.e. even if the main detent and the predetent of the rotary latch have already passed a detent tooth on the pawl, for example. This procedure is ultimately necessary to avoid any interaction of the pawl with the rotary latch in any case and to ensure a free opening of the rotary latch, i.e. an opening of the rotary latch seen over its complete travel, and without any interaction with the pawl.

Since, consequently and for safety reasons, the prior art predominantly proceeds in such a manner that the pawl is moved into the overtravel area or is acted upon with the aid of the drive unit, mechanical deceleration of the drive unit must also be provided, namely at the end of this travel movement. An end stop is usually assigned to the drive unit for this purpose. Since the pawl is acted upon directly or indirectly at the end of its travel, usually in the overtravel area, largely without load by the drive or drive unit, the end stop is often approached by the drive unit at high speed. This is accompanied by an impact of, for example, a worm wheel as a component of the drive unit against said end stop. As a result, individual components of the drive unit may be damaged.

This is because the aforementioned worm wheel is typically made of plastic, as are its teeth. Comparable rules generally apply to a worm located on a drive shaft of the electric motor, which engages with the outer circumferential teeth of the worm wheel. If the worm wheel now approaches the end stop hard, damage to the respective toothing (made of plastic) is possible or can occur, particularly on long time scales. For this reason, buffers are often used in conjunction with the end stop.

Apart from the mechanical loads on the drive unit observed and described in the prior art, reaching the end stop is also associated with more or less pronounced acoustic noises. Both aspects are overall disadvantageous and need improvement. This is where the invention steps in.

SUMMARY OF DISCLOSURE

The invention is based on the technical problem of further developing such a method and an associated device for operating an opening drive for a motor-vehicle lock in such a manner that, in particular, mechanical loads on the drive unit are reduced compared with the previous approach and optimized noise behavior is observed.

To solve this technical problem, a generic method within the scope of the invention is characterized in that the sensor associated with the rotary latch generates a signal only as soon as the rotary latch can be opened freely.

For this purpose, the sensor can be positioned relative to the rotary latch in such a manner as to ensure the passage of all detents on the rotary latch relative to the detent tooth on the pawl. This is because subsequently the ratchet tooth of the pawl can contact a circumferential surface of the rotary latch without any interaction being observed. At the same time, the drive unit can be decelerated and/or reversed.

According to an advantageous embodiment, the free opening of the rotary latch within the scope of an alternative is accompanied by the sensor reporting the opening of the rotary latch and, at the same time, an electrical power acting on the drive unit falling below a predetermined threshold. This means that the drive unit is controlled as a function of signals from the sensor and is ultimately switched off after the opening process as soon as not only the sensor signals the opening of the rotary latch, but also the electrical power applied to the drive unit falls below a predefined threshold. Only the coincidence of these two conditions ultimately leads to signal generation or to the fact that the drive unit is switched off on the basis of the generated signal and can also be switched off.

In most cases, the procedure is still such that the specified threshold of the electrical power applied to the drive unit corresponds to a threshold of the electrical current drawn by the drive unit as a function of time. In other words, the aforementioned threshold of electric power is associated with a threshold of absorbed electric current. This is because it can generally be assumed that the electrical voltage acting on the drive unit remains constant throughout or, in any case, is not subject to any major fluctuations, so that ultimately the electrical current absorbed by the drive unit and the undershooting of the predetermined threshold can be used as a measure of the free opening of the rotary latch in connection with the sensor reporting the opening of the rotary latch in accordance with the invention.

In this regard, the invention is further based on the understanding that, as a general rule, the free opening of the rotary latch is achieved when the pawl enters an overtravel area. In this overtravel area, the drive unit applies almost no load to the pawl because the pawl is safely lifted off the rotary latch. In addition, the procedure is usually such that the entry of the pawl into the overtravel area correlates, in particular coincides, with the electrical power threshold to be undershot.

Here, the invention is based on the realization that the electric current drawn by the drive unit has a characteristic time response. Initially, a sharp increase in current is observed to start the drive unit and overcome any breakaway torques. Following this, the electric current drawn by the drive unit drops exponentially for the most part during the direct or indirect loading of the pawl. As soon as the pawl reaches the overtravel area, any interaction between the pawl and the rotary latch is ruled out, so that in the overtravel area the pawl is loaded almost load-free with the aid of the drive unit.

This transition of the pawl under load during the opening process and when pivoting away from the rotary latch consequently changes to an almost load-free application of the pawl when entering the overtravel area. This is accompanied by a drop in the current drawn by the drive unit below the specified threshold, which can consequently be associated with the pawl entering the overtravel area. As soon as the electrical current drawn by the drive unit falls below this predefined threshold and the sensor has previously signaled the opening of the rotary latch, the drive unit can be decelerated and/or reversed. This has the particular advantage, achieved according to the invention, that the drive unit does not move at all or at least decelerates against a mechanical end stop. As a result, any mechanical loads on the drive unit are significantly reduced in accordance with the invention compared with the prior art. In addition, optimized noise behavior can be expected because a "hard stop" is no longer observed.

This can prevent the drive unit from reaching the end stop at all, or if it does, then only at decelerated speed. As a result, individual components of the drive unit can be designed to be less mechanically stable than in the previous approach. This applies, for example, to an optional gearbox as part of the drive unit. This is generally accompanied by a smaller overall volume occupied by the drive unit compared with the prior art, and also by a reduction in weight, both of which together offer particular advantages. Due to the fact that an end stop can generally even be dispensed with, further cost advantages are observed. In connection with the significantly reduced or even non-existent mechanical load when hitting the end stop, long service lives are observed in connection with improved functionality, because any damage to the intermeshing teeth is avoided according to the invention by the specially implemented controller. In fact, the controller ensures that the end stop can be completely omitted or is spared because the drive unit is decelerated and/or reversed before it is reached according to the invention. These are the main advantages.

It is also a subject-matter of the invention to provide a device for operating such an opening actuator, which particularly advantageously operates according to the claimed method. In any case, the sensor can already be positioned on its own to interrogate the rotary latch in such a manner that it only generates a signal as soon as the rotary latch can be opened freely. This signal is generally used to decelerate and/or reverse the drive unit acting directly or indirectly on the pawl, so that an existing but not absolutely necessary end stop is either not required or is at most approached by the drive unit at decelerated speed.

As a rule, not only the signal from the sensor is evaluated for the corresponding brake signal or reversing signal from the drive unit, but also the time-dependent current curve recorded by the drive unit. This time-dependent current has a characteristic curve which makes it possible to define a threshold which is undercut particularly when the overtravel area of the pawl is reached. That is, the overtravel area of the pawl and its attainment is associated with the current drawn by the drive unit falling below a predetermined value, according to the invention. In fact, this current corresponds to the fact that the drive unit applies almost no load to the pawl, so that any interactions with the rotary latch in this overtravel area do not (no longer) occur as a matter of principle.

These are the main advantages.

BRIEF DESCRIPTION OF DRAWINGS

In the following, the invention is explained in more detail with the aid of a drawing showing only an exemplary embodiment; in the figures.

DETAILED DESCRIPTION

Figure 1:
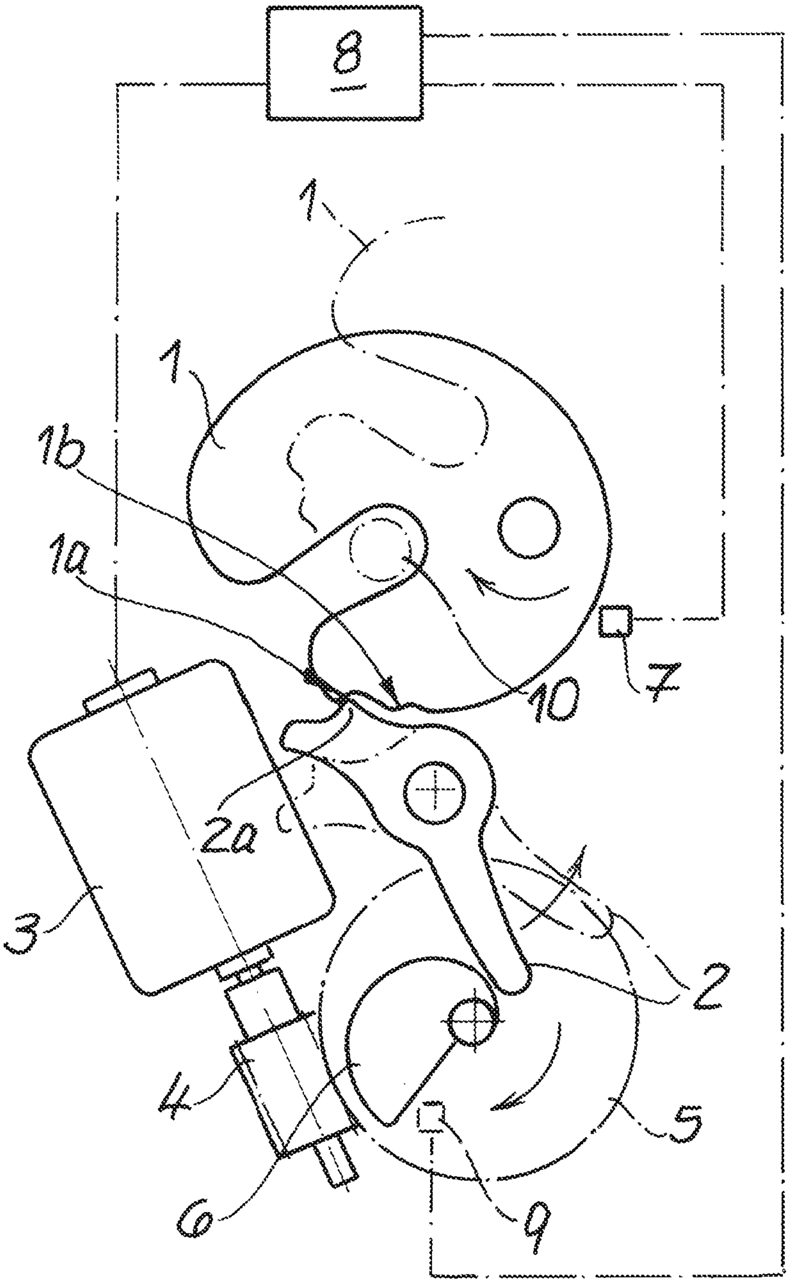
FIG. 1 shows a device according to the invention for operating an opening drive for a motor-vehicle lock schematically.

In the figures, a device for operating an opening drive for a motor-vehicle lock is represented. The motor-vehicle door lock is not restrictively a motor-vehicle door lock. The motor-vehicle lock or motor-vehicle door lock has a locking mechanism 1, 2 consisting substantially of rotary latch 1 and pawl 2. In addition, a drive unit 3, 4, 5, 6 is implemented which acts directly or indirectly on the pawl 2.

The position of the rotary latch 1 can be sensed using a sensor 7. The sensor 7 is connected to a common control unit 8, as is the drive unit 3, 4, 5, 6 or an electric motor 3 as part of the drive unit 3, 4, 5, 6.

The drive unit 3, 4, 5, 6 has the electric motor 3 mentioned earlier, which carries a worm 4 on its drive shaft. The worm 4 meshes with outer peripheral teeth of a worm wheel 5. The worm wheel 5 is equipped with a cam 6 which, according to the exemplary embodiment, is layered and configured to directly act on the pawl 2. In addition, an end stop 9 for the drive unit 3, 4, 5, 6 is also implemented, which in principle and according to the invention is also dispensable. The end stop 9 can be equipped with rubber elements or a buffer not expressly shown in order to avoid a hard stop of the worm wheel 5 interacting therewith at the end of the actuating travel of the drive unit 3, 4, 5, 6 and to minimize any acoustic noise associated therewith.

To open the locking mechanism 1, 2 shown in the closed state in FIG. 1, the electric motor drive unit 3, 4, 5, 6 is actuated with the aid of the control unit 6 in such a manner that the cam 6 carried by the worm wheel 5 performs a clockwise movement about an axis of the worm wheel 5 shown in FIG. 1. Since the cam 6 is designed to be eccentric, the clockwise movement of the worm wheel 5 causes the pawl 2 to increasingly pivot about its axis in a counterclockwise direction, as is also indicated in FIG. 1.

As a result, the pawl 2 is increasingly lifted from its engagement with the rotary latch 1. Since the rotary latch 1 is acted upon by a spring not shown or any door rubber forces of an associated motor-vehicle door, the lifting of the pawl 2 from its engagement with the rotary latch 1 causes the rotary latch 1 to pivot open about its axis in the clockwise direction also indicated in FIG. 1. This releases a previously captured locking bolt 10 and also allows a corresponding motor-vehicle door to be opened.

The rotary latch 1 performs a free opening as soon as the pawl 2 can no longer interact with the rotary latch 1. According to the exemplary embodiment, this is the case when a detent 1*a*, 1*b* or both detents 1*a*, 1*b* of the rotary latch 1 have safely passed a detent tooth 2*a* of the pawl 2. For this purpose, the pawl 2 is moved by the drive unit 3, 4, 5, 6 into an overtravel area, in which the pawl 2 is loaded almost load-free by the drive unit 3, 4, 5, 6. After completing the overtravel area, the drive unit 3, 4, 5, 6 drives against the end stop 9 or can drive against it, as will be explained in more detail below.

Figure 2:
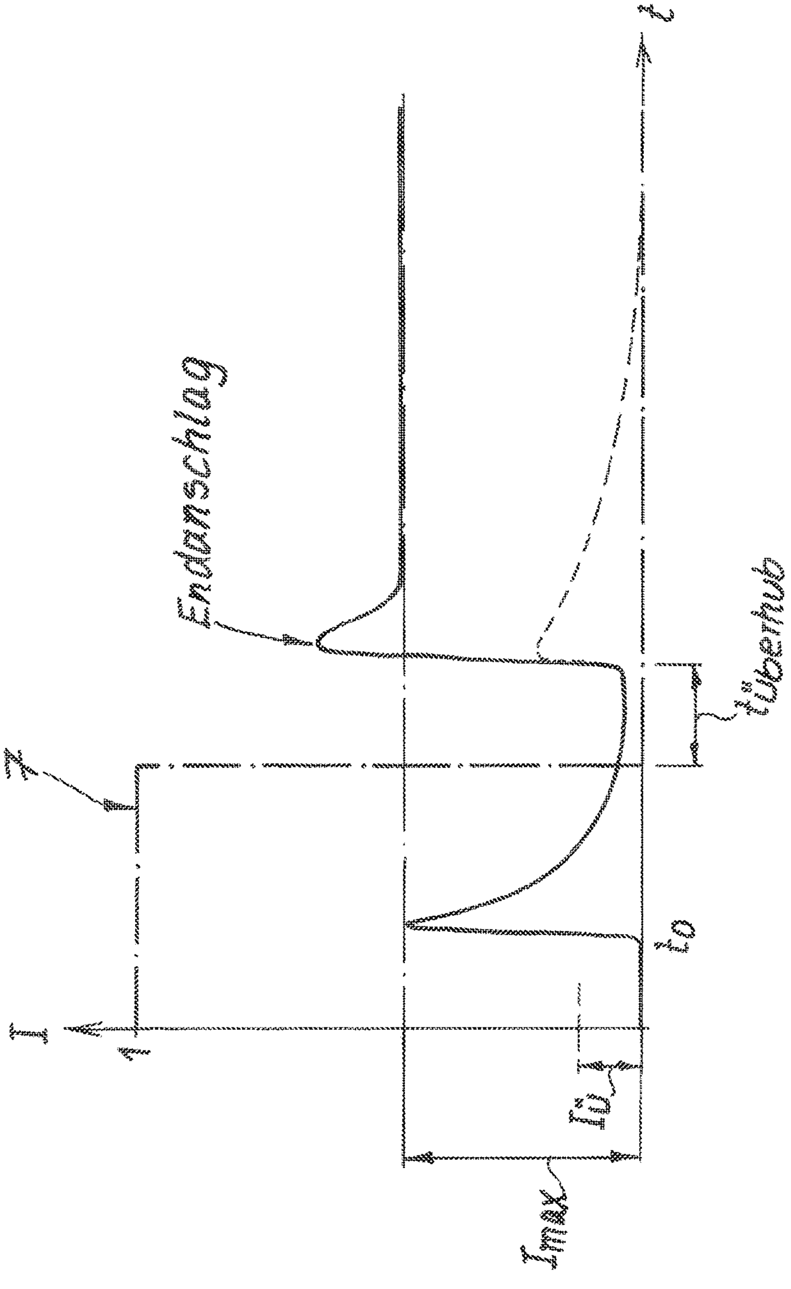
FIG. 2 shows a time diagram of the actuation of the sensor and the current drawn by the drive unit.

FIG. 2 now shows the opening process with the aid of diagrams. In the final analysis, two different curves can be seen: on the one hand, a dash-dotted curve for the time-resolved signal of the sensor 7 interrogating the rotary latch 1 and, on the other hand, a solid curve representing the time-resolved signal of the current I picked up by the drive unit 3, 4, 5, 6 or the electric motor 3 there.

At the start of the opening process ($t=t_0$) and even before, the sensor 7 outputs the signal "1", which corresponds to the fact that the rotary latch 1 is closed. As soon as, starting from the time $t=t_0$, the drive unit 3, 4, 5, 6 and in particular the electric motor 3 are energized, the current I drawn through and drawn by the electric motor 3 increases to a value Imax. This can be attributed to the fact that breakaway torques of the drive unit 3, 4, 5, 6 and any static friction must be overcome to start the opening process.

Subsequently, the electric current I consumed by the electric motor 3 and thus the drive unit 3, 4, 5, 6 drops exponentially for the most part over time t. According to the exemplary embodiment and in accordance with the invention, the design is now such that the sensor 7 performs a signal change from "1" to "0" in the sense of an opening of the rotary latch 1 when the pawl 2 passes into an area "$t_{overtravel}$" indicated in FIG. 2. Reaching this area "$t_{overtravel}$" is accompanied by the fact that the current I drawn by the electric motor 3 falls below a predetermined threshold $I_{Ü}$ or falls below this threshold $I_{Ü}$.

The sensor 7 can be positioned and designed in such a manner that it only signals the opening of the rotary latch 1 when the pawl 2 enters the overtravel area "$t_{overtravel}$". According to the exemplary embodiment, moreover, the signal of the sensor 7 and also the current I picked up by the electric motor 3 can be linked together in the control unit 8. In any case, the free opening of the rotary latch 1 is achieved when the pawl 2 enters the overtravel area "$t_{overtravel}$". In this overtravel area, the drive unit 3, 4, 5, 6 can apply almost no load to the pawl 2.

According to the invention, the entry of the pawl 2 into the overtravel area "$t_{overtravel}$" now correlates with the fact that the threshold $I_{Ü}$ of the absorbed electrical power or the absorbed electrical current I on the part of the electric motor 3 is undershot. As a result, when the pawl 2 enters the overtravel area "$t_{overtravel}$", the drive unit 3, 4, 5, 6 can be reversed and/or decelerated. As a result, according to the invention, there is no renewed current increase as shown in FIG. 2 following the overtravel area "$t_{overtravel}$", which corresponds to the fact that the drive unit 3, 4, 5, 6 has moved against the end stop 9. This means that, according to the invention, the diagram in FIG. 2 ends practically before the current rises again at the end stop or this current rise can be significantly reduced because the drive unit 3, 4, 5, 6 has been decelerated and/or reversed beforehand, i.e. before reaching the end stop 9.

As a result, the increase in current I following the overtravel area "$t_{overtravel}$" is alternatively represented as dashed in FIG. 2 and achieved according to the invention. It should be noted that, depending on the design of the control unit 8 and the drive unit 3, 4, 5, 6, the dashed area is not necessarily reached or does not have to be reached, so that the end stop 9—as already described—is basically dispensable. Either way, with the aid of the control unit 8 and the special positioning of the sensor 7 or the evaluation of the signal from the sensor 7 in connection with the current I drawn by the drive unit 3, 4, 5, 6, the mechanical loads on the drive unit 3, 4, 5, 6 can be significantly reduced compared with the previous prior art. This also has a positive effect on the noise behavior. These are the main advantages.

| List of reference numbers | |
|---|---|
| 1 | rotary latch |
| 1a | detent |
| 1b | detent |
| 2a | detent tooth |
| 2 | pawl |
| 3 | electric motor |
| 4 | worm |
| 5 | worm wheel |
| 6 | cams |
| 3, 4, 5, 6 | drive unit |
| 7 | sensor |
| 8 | control unit |
| 9 | end stop |
| t | time |

-continued

| List of reference numbers | |
|---|---|
| $I$ | current |
| $I_{Ü}$ | threshold |
| $I_{max}$ | value |
| $t_{overtravel}$ | overtravel area |

The invention claimed is:

1. A method for operating an opening drive for a motor-vehicle lock, wherein the motor vehicle lock comprises a locking mechanism including a rotary latch and a pawl, a sensor associated with the rotary latch, a drive unit acting indirectly or directly on the pawl, and a control unit configured to receive and evaluate a first signal representative of an electric current drawn by the drive unit and to receive and evaluate a second signal from the sensor,
   - the method comprising controlling the drive unit via the control unit as a function of the first signal and the second signal from the sensor,
   - wherein the sensor only generates the second signal as soon as the rotary latch is in a position to be opened freely, and
   - wherein controlling the drive unit as a function of the first signal and the second signal from the sensor includes switching off the drive unit after an opening process when the second signal indicates the opening of the rotary latch and the first signal indicates the electric current drawn by the drive unit falls below a predetermined threshold.

2. The method according to claim 1, wherein the predetermined threshold of the electric power corresponds to a threshold of electric current drawn by the drive unit as a function of time.

3. The method according to claim 1, wherein free opening of the rotary latch is achieved when the pawl enters an overtravel area.

4. The method according to claim 3, wherein the drive unit loads and/or reverses and/or decelerates the pawl in the overtravel area without load of sufficient amount such that the pawl is lifted from the rotary latch.

5. The method according to claim 3, wherein the entry of the pawl into the overtravel area correlates with a threshold to be undershot of electric current or electric power drawn by the drive unit.

6. A device for operating an opening drive for a motor-vehicle lock for performing the method according to claim 1, the device comprising:
   - a locking mechanism including a rotary latch and a pawl,
   - a sensor associated with the rotary latch,
   - a drive unit acting indirectly or directly on the pawl, wherein the drive unit is configured to control the pawl as a function of a signal from the sensor, and
   - a control unit configured to receive and evaluate a first signal representative of an electric current drawn by the drive unit and to receive and evaluate a second signal from the sensor, wherein the control unit is further configured to control the drive unit as a function of the first signal and the second signal from the sensor and switch off the drive unit after the opening process when the second signal indicates the opening of the rotary latch and the first signal indicates the electrical current drawn by the drive unit falls below a predetermined threshold,
   - wherein the sensor only generates the second signal as soon as the rotary latch is in a position to be opened freely.

7. The device according to claim 6, wherein the control unit evaluates the electric current drawn by the drive unit in a time-resolved manner.

8. The device according to claim 6, wherein the control unit links the time-resolved electric current to the second signal from the sensor.

9. The method according to claim 1, wherein in response to the first signal and the second signal from the sensor the drive unit is decelerated and/or reversed.

10. The method according to claim 9, further comprising an end stop in an overtravel area, and drive unit is decelerated and/or reversed prior to impacting the end stop.

11. The method according to claim 5, wherein upon undershot the drive unit is decelerated and/or reversed.

* * * * *